United States Patent
Matsushita et al.

(10) Patent No.: US 12,421,161 B2
(45) Date of Patent: *Sep. 23, 2025

(54) INFRARED-TRANSMITTING GLASS

(71) Applicant: NIPPON ELECTRIC GLASS CO., LTD., Otsu (JP)

(72) Inventors: Yoshimasa Matsushita, Otsu (JP); Fumio Sato, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 973 days.

This patent is subject to a terminal disclaimer.

(21) Appl. No.: 17/430,420

(22) PCT Filed: Feb. 21, 2020

(86) PCT No.: PCT/JP2020/007217
§ 371 (c)(1),
(2) Date: Aug. 12, 2021

(87) PCT Pub. No.: WO2020/175402
PCT Pub. Date: Sep. 3, 2020

(65) Prior Publication Data
US 2022/0127185 A1    Apr. 28, 2022

(30) Foreign Application Priority Data

Feb. 28, 2019    (JP) .................. 2019-035816

(51) Int. Cl.
C03C 4/10    (2006.01)
C03C 3/253    (2006.01)
C03C 3/32    (2006.01)
G02B 5/20    (2006.01)

(52) U.S. Cl.
CPC ............ C03C 4/10 (2013.01); C03C 3/253 (2013.01); G02B 5/208 (2013.01)

(58) Field of Classification Search
CPC ............ C03C 3/321; C03C 3/323; C03C 4/10
See application file for complete search history.

(56) References Cited

U.S. PATENT DOCUMENTS

| | | | | |
|---|---|---|---|---|
| 8,603,928 B2 * | 12/2013 | Tani | .......................... | C03C 4/10 501/40 |
| 11,919,806 B2 * | 3/2024 | Matsushita | ........... | G01J 1/0488 |
| 2016/0311719 A1 | 10/2016 | Yamada et al. | | |
| 2018/0257977 A1 | 9/2018 | Nagashima et al. | | |

FOREIGN PATENT DOCUMENTS

| CN | 105722801 A | | 6/2016 |
|---|---|---|---|
| EP | 1 642 870 B1 | | 3/2008 |
| JP | 62-222444 A | | 9/1987 |
| JP | 201705711 A | * | 3/2017 |
| JP | 2017-114733 A | | 6/2017 |
| WO | 2017/086227 A1 | | 5/2017 |
| WO | WO2017110500 | * | 6/2017 |
| WO | 2017/168939 A1 | | 10/2017 |

OTHER PUBLICATIONS

Golovchak. Structural evolution of Ga—Ge—Te glasses by combined EXAFS and XPS analysis. J. Chem. Phys. 139, 054508 (2013) (Year: 2013).*

Danto. A Family of Far-Infrared-Transmitting Glasses in the Ga—Ge—Te System for Space Applications*.Adv. Funct. Mater. 2006, 16, 1847-1852 (Year: 2006).*

Official Communication issued in International Patent Application No. PCT/JP2020/007217, mailed on Mar. 24, 2020.

Goncalves et al., "Semiconducting glasses: A new class of thermoelectric materials?", Journal of Solid State Chemistry, vol. 193, 2012, pp. 26-30.

Official Communication issued in corresponding Chinese Patent Application No. 202080009039.3, mailed on Sep. 5, 2022.

* cited by examiner

*Primary Examiner* — Matthew E. Hoban
(74) *Attorney, Agent, or Firm* — Keating & Bennett, LLP

(57) ABSTRACT

Provided is a thermally stable and inexpensive infrared-transmitting glass. An infrared-transmitting glass contains, in terms of % by mole, over 0 to 9% Ge, over 0 to 50% Ga, 50 to 90% Te, 0 to 40% Si+Al+Ti+Cu+In+Sn+Bi+Cr+Sb+Zn+Mn+Cs+Ag+As+Pb, and 0 to 40% F+Cl+Br+I.

3 Claims, No Drawings

INFRARED-TRANSMITTING GLASS

TECHNICAL FIELD

The present invention relates to infrared-transmitting glasses for use in infrared sensors and so on.

BACKGROUND ART

Vehicle-mounted night vision devices, security systems, and the like are equipped with an infrared sensor for use to detect living bodies at night. Infrared sensors are devices operable to sense infrared rays with wavelengths of about 8 to 14 μm emitted from living bodies and are provided, in front of the sensor part, with an optical element, such as a filter or a lens, capable of transmitting infrared rays in the above wavelength range.

Conventionally, Ge or ZnSe is used as a material for the optical element as described above. However, these materials are crystalline bodies and therefore have poor workability, which presents a problem of difficulty in working them into complicated shapes, such as an aspheric lens.

To cope with the above, chalcogenide glasses are proposed as vitreous materials capable of transmitting infrared rays with wavelengths of about 8 to 14 μm and relatively easily workable into shape (for example, Patent Literature 1).

CITATION LIST

Patent Literature

[PTL 1]
European Patent No. 1642870

SUMMARY OF INVENTION

Technical Problem

The glass described in Patent Literature 1 has a narrow vitrification range and thermal instability. Furthermore, the glass contains Ge in large amounts and therefore has a cost disadvantage.

In view of the above, the present invention has an object of providing a thermally stable and inexpensive infrared-transmitting glass.

Solution to Problem

The inventors conducted intensive studies and, as a result, found that the above problem can be solved by a glass having a particular composition. Specifically, an infrared-transmitting glass according to the present invention contains, in terms of % by mole, over 0 to 9% Ge, over 0 to 50% Ga, 50 to 90% Te, 0 to 40% Si+Al+Ti+Cu+In+Sn+Bi+Cr+Sb+Zn+Mn+Cs+Ag+As+Pb, and 0 to 40% F+Cl+Br+I. As used herein, "(component)+(component)+ . . . " means the total sum of the contents of the relevant components.

In an optical element according to the present invention, the above-described infrared-transmitting glass is used.

In an infrared sensor according to the present invention, the above-described optical element is used.

Advantageous Effects of Invention

The infrared-transmitting glass according to the present invention enables provision of a thermally stable and inexpensive infrared-transmitting glass.

DESCRIPTION OF EMBODIMENTS

An infrared-transmitting glass according to the present invention contains, in terms of % by mole, over 0 to 9% Ge, over 0 to 50% Ga, 50 to 90% Te, 0 to 40% Si+Al+Ti+Cu+In+Sn+Bi+Cr+Sb+Zn+Mn+Cs+Ag+As+Pb, and 0 to 40% F+Cl+Br+I. The reasons why the glass composition is defined as above will be described below. In the following description of the respective contents of components, "%" refers to "% by mole" unless otherwise specified.

Ge is an essential component for forming the glass network. The content of Ge is over 0 to 9%, preferably 1 to 8%, and more preferably 5 to 7%. If the content of Ge is too small, vitrification becomes difficult. On the other hand, if the content of Ge is too large, Ge-based crystals precipitate to make infrared rays less likely to pass through the glass and the raw material cost tends to rise.

Ga is an essential component that increases the thermal stability of the glass (the stability of vitrification). The content of Ga is over 0 to 50%, preferably 1 to 40%, more preferably 2 to 30%, still more preferably 3 to 20%, and particularly preferably 5 to 10%. If the content of Ga is too small, vitrification becomes difficult. On the other hand, if the content of Ga is too large, Ga-based crystals precipitate to make infrared rays less likely to pass through the glass and the raw material cost tends to rise.

Te, which is a chalcogen element, is an essential component that forms the glass network. The content of Te is 50 to 90%, more preferably 60 to 89%, still more preferably 65 to 88%, and particularly preferably 70 to 85%. If the content of Te is too small, vitrification becomes difficult. On the other hand, if the content of Te is too large, Te-based crystals precipitate to make infrared rays less likely to pass through the glass.

Si, Al, Ti, Cu, In, Sn, Bi, Cr, Sb, Zn, Mn, Cs, Ag, As, and Pb are components that increase the thermal stability of the glass without decreasing the infrared transmission properties. The content of Si+Al+Ti+Cu+In+Sn+Bi+Cr+Sb+Zn+Mn+Cs+Ag+As+Pb is 0 to 40%, preferably 0.1 to 20%, and particularly preferably 0.2 to 10%. If the content of Si+Al+Ti+Cu+In+Sn+Bi+Cr+Sb+Zn+Mn+Cs+Ag+As+Pb is too large, vitrification becomes difficult. The infrared-transmitting glass is preferably substantially free of As and Pb in consideration of their toxicity and environmental burden. Therefore, in the case where the infrared-transmitting glass is substantially free of As and Pb, the content of Si+Al+Ti+Cu+In+Sn+Bi+Cr+Sb+Zn+Mn+Cs+Ag is preferably 0 to 40%, more preferably 0.1 to 20%, and particularly preferably 0.2 to 10%. As used herein, "substantially free of" means that no amount of these components are deliberately contained in the raw materials, and is not intended to exclude even the incorporation thereof in impurity level. Objectively, the content of each component is preferably less than 0.1%. Furthermore, the content of each component of Si, Al, Ti, Cu, In, Sn, Bi, Cr, Sb, Zn, Mn, Cs, Ag, As, and Pb is preferably 0 to 40%, more preferably 0.1 to 20%, and particularly preferably 0.2 to 10%. Of these, the use of Ag and/or Sn is preferred because their effect of increasing the thermal stability of the glass is particularly large.

F, Cl, Br, and I are also components that increase the thermal stability of the glass. The content of F+Cl+Br+I is 0 to 40%, preferably 0 to 20%, and particularly preferably 0.1 to 10%. If the content of F+Cl+Br+I is too large, vitrification becomes difficult and the weather resistance is likely to decrease. The content of each component of F, Cl, Br, and I is preferably 0 to 40%, more preferably 0 to 20%, and particularly preferably 0.1 to 10%. Of these, I is preferably used because its elemental material is usable and its effect of increasing the thermal stability of the glass is particularly large.

The infrared-transmitting glass according to the present invention may contain, in addition to the above components, the following components.

Se, which is a chalcogen element, is a component that widens the vitrification range and increases the thermal stability of the glass. The content of Se is preferably 0 to 40%, more preferably 0.1 to 20%, and particularly preferably 0.2 to 10%. However, Se is toxic and, therefore, from the viewpoint of reducing the influences on environment and human bodies, its content is preferably 5% or less, more preferably 3% or less, and still more preferably 1% or less, and the glass is particularly preferably substantially free of Se.

S, which is a chalcogen element, is a component that widens the vitrification range and increases the thermal stability of the glass. However, if the content of S is too large, infrared rays are less likely to pass through the glass. Therefore, the content of S is preferably 0 to 40%, 0 to 20%, 0 to 10% or 0 to 4% and the glass is particularly preferably substantially free of S.

The infrared-transmitting glass according to the present invention is preferably substantially free of Cd and Tl which are toxic substances. By doing so, the influence on environment can be minimized.

The infrared-transmitting glass according to the present invention preferably does not contain devitrified matter having a length of 500 μm or more. Even if the infrared-transmitting glass contains devitrified matter, its length is less than 500 μm, preferably 200 μm or less, 100 μm or less, or 50 μm or less, and particularly preferably 10 μm or less. Thus, the deterioration in infrared transmission properties can be reduced. $Ga_2O_3$ produced by oxidation of glass during melting is likely to become devitrified matter and, therefore, it is preferred to reduce the production of the devitrified matter by a method to be described later. As used In the present invention, devitrified matter means a foreign substance present in the glass and refers to particles of unmelted raw materials or crystal precipitates and agglomerates of these particles.

In the infrared-transmitting glass according to the present invention, the infrared absorption edge wavelength at a thickness of 2 mm is preferably 15 μm or more, more preferably m or more, and particularly preferably 21 μm or more. As used in the present invention, "infrared absorption edge wavelength" refers to a wavelength at which the light transmittance reaches 10% in an infrared range of wavelengths of not less than 8 μm.

The infrared-transmitting glass according to the present invention has an excellent average infrared transmittance at a wavelength of about 8 to 14 μm. Specifically, the average internal transmittance at a wavelength of 8 to 14 μm is preferably 80% or more and particularly preferably 90% or more. If the internal transmittance is too low, the sensitivity to infrared rays becomes poor, so that an infrared sensor may not sufficiently function.

The infrared-transmitting glass according to the present invention can be produced, for example, in the following manner. Raw materials are mixed to give the glass composition described above, thus obtaining a raw material batch. Next, a quartz glass ampoule is evacuated with the application of heat, the raw material batch is then put into the quartz glass ampoule, and the quartz glass ampoule is sealed with an oxygen burner. It is sufficient that no oxygen exists in the ampoule, and an inert gas or the like may be encapsulated in the ampoule. Next, the sealed quartz glass ampoule is raised in temperature to 650 to 1000° C. at a rate of 10 to 40° C./hour in a melting furnace and then held for six to twelve hours. During the holding time, as necessary, the quartz glass ampoule is turned upside down to stir the melt.

Subsequently, the quartz glass ampoule is taken out of the melting furnace and rapidly cooled to room temperature, thus obtaining an infrared-transmitting glass according to the present invention.

An optical element can be produced by working the infrared-transmitting glass obtained in the above manner into a predetermined shape (such as a disc shape or a lenticular shape).

For the purpose of increasing the transmittance, an antireflection film may be formed on one or both sides of the optical element. Examples of the method for forming the antireflection film include vacuum deposition, ion plating, and sputtering.

Alternatively, after the antireflection film is formed on the infrared-transmitting glass, the infrared-transmitting glass may be worked into the predetermined shape. However, because the antireflection film is likely to peel off during the working process, the antireflection film is preferably formed after the infrared-transmitting glass is worked into the predetermined shape, unless the circumstances are exceptional.

Since the infrared-transmitting glass according to the present invention has an excellent infrared transmittance, it is suitable as a cover member for protecting a sensor part of an infrared sensor or an optical element, such as a lens, for focusing infrared light on an infrared sensor part of the infrared sensor.

EXAMPLES

Hereinafter, the present invention will be described with reference to examples, but is not limited to these examples.

Tables 1 and 2 show Examples of the present invention and a Comparative Example.

TABLE 1

|  |  | 1 | 2 | 3 | 4 | 5 | 8 | 7 | 8 | 9 |
|---|---|---|---|---|---|---|---|---|---|---|
| Glass Composition | Ge | 5 | 5 | 7 | 9 | 3 | 1 | 4 | 4 | 1 |
| (% by mole) | Ga | 10 | 18 | 10 | 2 | 7 | 4 | 22 | 27 | 32 |
|  | Ag | 5 | 2 | 10 | 18 | 7 | 8 |  |  |  |
|  | Sn |  |  |  |  |  |  | 3 | 1 | 2 |
|  | I |  |  |  |  |  |  | 3 | 6 | 9 |
|  | Te | 80 | 75 | 73 | 71 | 83 | 87 | 68 | 62 | 56 |
| Vitrification |  | good | good | good | good | good | good | good | good | good |
| Internal Transmittance |  | good | good | good | good | good | good | good | good | good |

TABLE 2

|  |  | 10 | 11 | 12 | 13 | 14 | 15 | 16 | 17 | 18 |
|---|---|---|---|---|---|---|---|---|---|---|
| Glass Composition | Ge | 1 | 1 | 2 | 5 | 1 | 2 | 1 | 2 | 15 |
| (% by mole) | Gs | 37 | 42 | 45 | 6 | 4 | 2 | 1 | 1 | |
|  | Ag |  |  |  | 14 | 23 | 28 | 33 | 37 | 45 |
|  | Sn | 9 | 6 |  |  |  |  | 7 | 2 | |
|  | I | 2 | 1 | 3 | 15 | 20 | 18 | 8 | 8 | |
|  | Te | 51 | 50 | 50 | 60 | 52 | 50 | 50 | 50 | 40 |
| Vitrification | | good | good | good | good | good | good | good | good | poor |
| Internal Transmittance | | good | good | good | good | good | good | good | good | — |

Each sample in Examples 1 to 17 and Comparative Example 18 was prepared in the following manner. A quartz glass ampoule was evacuated with the application of heat and a raw material batch formulated to give each glass composition shown in the tables was then put into the quartz glass ampoule. Next, the quartz glass ampoule was sealed with an oxygen burner. Thereafter, the sealed quartz glass ampoule was raised in temperature to 650 to 1000° C. at a rate of 10 to 40° C./hour in a melting furnace and then held for six to twelve hours. During the holding time, the quartz glass ampoule was turned upside down to stir the melt. Subsequently, the quartz glass ampoule was taken out of the melting furnace and rapidly cooled to room temperature, thus obtaining a sample.

Each of the obtained samples was subjected to X-ray diffraction and, based on its diffraction spectrum, whether the sample became vitrified was confirmed. In the tables, vitrified samples are represented to be "good", whereas unvitrified samples are represented to be "poor".

Furthermore, each sample was measured in terms of internal transmittance. With regard to the internal transmittance for each sample, the sample polished with a thickness of 2 mm±0.1 mm and the sample polished with a thickness of 10 mm±0.1 mm were each measured in terms of transmittance including surface reflectance loss and their internal transmittances at a wavelength of 8 to 14 μm were calculated from the obtained measured values. Samples having an average internal transmittance of 80% or more are represented to be "good", whereas samples having an average internal Ftransmittance of less than 80% are represented to be "poor".

As shown in the tables, the samples in Examples 1 to 17 were confirmed to become vitrified. Furthermore, these samples had an internal transmittance as high as 80% or more at a wavelength of 8 to 14 μm and thus exhibited good infrared transmission properties.

On the other hand, the sample in Comparative Example 18 was not vitrified and its internal transmittance at a wavelength of 8 to 14 μm could not be measured.

INDUSTRIAL APPLICABILITY

The infrared-transmitting glass according to the present invention is suitable as a cover member for protecting a sensor part of an infrared sensor or an optical element, such as a lens, for focusing infrared light on an infrared sensor part of the infrared sensor.

The invention claimed is:

1. An infrared-transmitting glass containing, in terms of % by mole, over 0 to 5% Ge, 18 to 50% Ga, 50 to 90% Te, 0 to 40% Si+Al+Ti+Cu+In+Sn+Bi+Cr+Sb+Zn+Mn+Cs+Ag+As+Pb, and 0 to 40% F+Cl+Br+I, wherein the infrared-transmitting glass contains Ag and/or Sn, and the infrared-transmitting glass is substantially free of S and Se.

2. An optical element comprising:
the infrared-transmitting glass according to claim 1.

3. An infrared sensor comprising:
the optical element according to claim 2.

* * * * *